US006635300B2

(12) United States Patent
Adolphi et al.

(10) Patent No.: US 6,635,300 B2
(45) Date of Patent: Oct. 21, 2003

(54) AERATED FROZEN PRODUCT

(75) Inventors: Ulrich Adolphi, Bedford (GB);
Andrew Richard Cox, Bedford (GB)

(73) Assignee: Good-Humor-Breyers Ice Cream, division of Conopco, Inc., Green Bay, WI (US)

( * ) Notice: Subject to any disclaimer, the term of this patent is extended or adjusted under 35 U.S.C. 154(b) by 361 days.

(21) Appl. No.: 09/803,704

(22) Filed: Mar. 9, 2001

(65) Prior Publication Data

US 2002/0197375 A1 Dec. 26, 2002

(30) Foreign Application Priority Data

Mar. 9, 2001 (GB) .............................. 0105767

(51) Int. Cl.[7] ................................. A23G 9/00
(52) U.S. Cl. ...................... 426/565; 426/519; 426/521; 426/524; 426/654
(58) Field of Search ................................ 426/565, 654, 426/519, 521, 524

(56) References Cited

FOREIGN PATENT DOCUMENTS

| WO | 91/11109 | 8/1991 |
|---|---|---|
| WO | 00/49883 | 8/2000 |
| WO | 01/06865 A1 | 2/2001 |

OTHER PUBLICATIONS

Search Report (Application No. GB 0122823.8).
Search Report (Application No. GB 0105767.8).
"Effects of Emulsifiers On Protein–Fat Interaction In Ice Cream Mix During Ageing I: Quantitative Analyses", Barfod et al., *Fat Science and Technology*, 93, (1991), pp. 24–29.
"Ice Cream", W.S. Arbuckle, Ari Publishing, 1972, pp. 194–197.
"A Comparison Of Quantitative Methods Of Shape Characterization", A.G. Flook, *Acta Stereologica*, vol. 3, No. 2, 1984, pp. 159–164.
Related Case No. F3281/1(C); Adolphi et al.; 10/093,545; filed Mar. 8, 2002; "Aerated Frozen Product".
International Search Report mailed Aug. 21, 2002 on Application No. PCT/EP 02/02353.

*Primary Examiner*—Nina Bhat
(74) *Attorney, Agent, or Firm*—Gerard J. McGowan, Jr.

(57) ABSTRACT

An aerated frozen product comprising less than 8% fat by weight and characterized in that the aerated frozen product comprises fat platelets, and after it has been melted and cooled, comprises fat platelets and spherical fat globules at a platelet to sphere ratio of greater than 0.05.

12 Claims, 10 Drawing Sheets

AERATED FROZEN PRODUCT

FIELD OF THE INVENTION

The present invention relates to an aerated frozen product having low fat content. More particularly, the invention relates to an aerated frozen dessert product having low fat content wherein at least part of the fat is present in the form of platelets and which achieves physical and sensory properties more commonly associated with higher fat products.

BACKGROUND OF THE INVENTION

Frozen aerated products such as ice cream are complex mixtures, which are often defined in terms of continuous and dispersed phases. The continuous phase is a combination of an unfrozen solution, a fat emulsion and a suspension of solids in liquid. Water, sugar, hydrocolloids, proteins and other solubles make up the unfrozen solution. Suspended in the aqueous phase are insoluble solids, including ice crystals, and milk solids. The continuous phase also consists of dispersed air bubbles, or foam.

The ingredients and processing variables used in its production dictate the characteristics of this mixture and therefore the aerated product's sensory attributes. Quality ice cream, for example, should possess a smooth and creamy mouthfeel resulting from a high level of homogeneity of the components. An ice cream's texture refers to its smoothness and is perceived whilst the ice cream is being manipulated in the mouth. The characteristic is directly related to the size of the crystalline material present.

Most of the fat and water present is in the crystalline state, but ice crystals and air cells form a coarser dispersion than that of fat globules. The roughness observed when perceptible crystals are present is generally felt to be a sign of diminished quality.

In addition to controlling the extent of crystallisation in the frozen aerated product, the physical properties of frozen ice cream complex must be controlled for a quality ice cream. Such a product should not melt away too quickly at ambient temperature so as, for example to retain its firmness to the spoon for the period of its consumption. However, the product must melt when exposed to elevated temperatures and in particular should exhibit a gradual and controlled melting behaviour when put in the mouth upon eating.

Air cell stability and size in the aerated frozen product influence that product's meltdown characteristics and mouthfeel. After ice cream has been extruded, for example, the stability and size of the cells depend on the mechanical properties of the air interface and the properties of the medium surrounding the cells. The interface comprises emulsifiers, such as proteins, fat globules and agglomerated fat globules or droplets. On account of their shape, globules are typically equated with "spheres" and innumerable shapes can be formed from combination of those globules as they agglomerate. However, the partial protrusion of these globules and agglomerates from the interface together with fat completely dispersed in the continuous phase also indirectly stabilize the aerated product.

These fat agglomerates are formed during the processing of ice cream emulsion. Fat present in the pre-mix (simply the mixture of ice cream ingredients before the steps of homogenization and pasteurisation) is emulsified when that pre-mix is homogenized to form fat globules. The extent of emulsification depends on the type of fat, proteins and other emulsifiers present in the pre-mix. Typically the homogenized mixture containing emulsified fat is then pasteurised to form what is known in the art as the "mix", aged for a period of time, and later frozen, aerated and extruded. The actual agglomeration of emulsified fat occurs during the later freezing and aerating process.

Emulsifying ingredients must be chosen to allow this fat agglomeration to occur. The possibility of obtaining too much agglomeration (resulting in an oily sensation upon eating the final aerated product) and no agglomeration (resulting in a poor structure for the product) is considerable.

Small molecular emulsifiers control the extent of fat agglomeration by partially destabilizing the fat globule membrane. Although there are a number of suitable food grade emulsifiers, fatty acid monoglyceride and diglyceride esters are commonly used.

During the ageing time of the mix used to form the aerated product, the action of the small molecule emulsifiers causes protein rearrangement at the oil/water interface, and some protein is desorbed. The state of the interfacial layer at the end of this ageing time will determine the stability of the fat globules to the subsequent shear and aeration process. The lower the emulsion stability, the more fat agglomeration that will result during processing. During ageing of the mix, some liquid fat present will crystallise. This crystallisation process does not, however, lead to any significant change in the geometry of the fat globule.

Since the beginning of the 1980s there has been an increasing demand for confectionery products and desserts such as ice cream and related products which have a reduced calorific value. Reducing the amount of fat in the ice cream would be the most effective way of reducing the calorific value as it has a calorific value per gram which is higher than that of carbohydrates. By reducing the amount of fat in the ice cream, considerable difficulties arise as its effectiveness in stabilising the structure is reduced. Further, key sensory attributes of ice cream such as creamy texture, mouthcoating and thickness are dominated by the flow behaviour of the aerated product during melting; changes to the fat content alters the viscosity of the mix and the air cell structure of the aerated product.

To compensate for reduced stability as the content of the fat is reduced, solutions would include using polysaccharide as a stabilizer and modifying the proteins (which are also adsorbed in the air cell interface). These changes to formulation have unsatisfactory results for the taste and texture of the ice cream. An alternative solution is to replace the typical fats of ice cream (triglycerides) with a fat simulating material. WO91/11109 (Whelan et al.) discloses replacement of fat with polyol fatty acid polyesters having at least four fatty acid groups, each group containing from 2 to 24 carbon atoms. These polyesters retain the organoleptic properties of the ice cream but have the disadvantage that they either have an undesirable laxative effect or give a waxy mouthfeel.

Recently, homogenisation technologies have been utilized in the ice cream industry to decrease the size and increase the number of fat globules in the ice cream product. This provides better distribution of the available fat in the fat-reduced product. However, to maintain maximum functionality of the small oil droplets the emulsifier system needs to be adjusted (as described in Barfod N. M et al. "Effects of Emulsifier on Protein-Fat interactions in the Ice Cream Mix during Ageing: Quantitative Analysis" Fat Science and Technology 93 (1991) 24–29) and severe shear conditions such as those applied by low temperature extrusion are advantageous. Such technologies are not readily available and are expensive.

It is therefore an object of the invention to provide an aerated frozen product having low fat content but high stability and meltdown resistance at ambient temperatures.

It is another object of the invention to provide an aerated frozen product that exhibits controlled and gradual meltdown when exposed to the temperatures of the mouth upon eating.

It is also an object of the invention to provide an aerated frozen dessert product having low fat content that has a thick and creamy mouthfeel.

It is a further object of the invention to provide an aerated frozen product that can be produced economically using readily available technologies.

SUMMARY OF THE INVENTION

These and other objects of the invention are achieved by the present invention which comprises an aerated frozen product comprising less than 8% fat by weight and characterized in that the aerated frozen product comprises fat platelets, and after it has been melted and cooled comprises fat platelets and spherical fat globules at a platelet to sphere ratio of greater than 0.05.

In this invention, spherical oil globules as known in standard mixes and the agglomerates they form are replaced in part by fat platelets such that the fat platelets co-exist with the globules and agglomerates in the mix and the frozen aerated product. It has been shown by Scanning Electron Microscopy that such platelets exist in both the lamella surrounding the air cells and in the continuous phase of the aerated frozen product. The platelets improve the homogeneity of the continuous phase and the temperature tolerance of the frozen aerated product when compared to standard frozen aerated products containing that level of fat and not including fat platelets.

In accordance with a first embodiment of the present invention there is provided an aerated frozen product comprising less than 8% fat by weight and characterized in that the aerated frozen product comprises fat platelets, and after it has been melted and cooled comprises fat platelets and spherical fat globules at a platelet to sphere ratio of greater than 0.05, the aerated frozen product also satisfying the condition that percentage mass loss after 120 minutes is less than 90% at 20° C.

In accordance with a second embodiment of the present invention there is provided an aerated frozen product comprising less than 8% fat by weight and characterized in that the aerated frozen product comprises fat platelets, and after it has been melted and cooled comprises fat platelets and spherical fat globules at a platelet to sphere ratio of greater than 0.05, the aerated food product also satisfying the condition that the percentage mass loss after 120 minutes is less than 100% at 37° C.

Preferably the platelet to sphere ratio is greater than 0.3. More preferably it is preferred that the platelet:sphere ratio is greater than 0.6.

Preferably the frozen aerated product comprises less than 6% fat by weight. More preferably the product comprises less than 4% fat by weight.

Preferably the frozen aerated product at an overrun of between 30% and 200% and more preferably at an overrun between 50 and 150% (wherein overrun is defined in "Ice cream" by W. S. Arbuckle, Ari Publishing, 1972, p194.)

A preferred component of the frozen aerated product is the emulsifier, which is present to disperse the fat particles. Also the emulsifiers facilitate air incorporation during freezing to provide a finer dispersion of air cells that imparts a smoother body and texture and slower meltdown to the resulting aerated product. The particular amount of emulsifier that is effective will depend on the type of emulsifier and the particular composition of the frozen product. Preferably, the aerated frozen product comprises from about 0.05 to 0.2% emulsifier by weight.

As is known in the art, the pre-mix of frozen product, before it is processed to form the aerated frozen product, comprises an oil-in-water emulsion whereby some emulsifiers are present at the oil-water interface, and others are present in the bulk fat phase. For the formation of fat platelets during aging of such pre-mixes it is preferred that the fat type must have a relatively high solid:liquid ratio in the fat phase present at the aging temperature. Secondly, the fat used must have the habit of forming large crystals within the bulk fat phase, a feature that is not only dependent on fat type but also the additives, such as emulsifiers, which are present. Also it is preferred that the fat and emulsifier and other additives which are to be included in the oil-water interface are chosen such that the interfacial tension of the oil-water interface present in the pre-mix is low enough to allow for the transition from sphere to platelet.

It is preferred that the frozen aerated product comprises an effective amount of fat selected from the group consisting of hardened coconut oil, palm kernel oil, hardened soy bean oil and rape seed oil.

It is preferred that the emulsifier comprises monoglycerides of unsaturated fatty acids hereinafter referred to as unsaturated monoglycerides. The degree of saturation of fatty acids and derivatives thereof is normally quantified by the iodine value (IV). The iodine value is defined as the number of grams of iodine absorbed by 100 grams of fat or oil. Fatty acids and derivatives having iodine values greater than 3 are understood to be at least partially unsaturated whereby partly means a mixture of saturated and (mono- or poly-unsaturated) fatty acids or derivatives. It is preferable that the monoglycerides used in the present invention have an iodine value greater than 50.

Although the invention is disclosed with specific reference to ice cream, it is to be understood that the term frozen aerated product includes all suitable products. In circumstances where the fat is not conventionally present in an aerated frozen product, but is included for textural reasons, that product falls within the scope of the present invention.

The frozen aerated product of the present invention may also comprise other compounds and ingredients, which may be selected from water, stabilisers, sweeteners such as sucrose, and proteins.

Water provides a continuous aqueous phase in which emulsified fats may be dispersed, dissolved or suspended. Upon freezing the aqueous phase provides ice crystals. The source of water may be added water or it could be supplied from fluid ingredients such as those used to supply milk solids other than fat. The level of water can be varied according to the structural properties desired, and the level of other components. Usually aerated frozen products comprise 50 to 75% water by weight.

Stabilisers are typically present in aerated frozen products although it is noted in particular that the stabilising effects of the fat platelets may allow for stabiliser replacement in a number of frozen aerated product applications. Suitable stabilisers include alginates, gelatin, gum acacia, guar gum, gum karaya. Locust bean gum, carageenan and salts thereof, xanthan gum, microcrystalline cellulose, cellulose ethers or mixtures thereof. The amount of stabiliser is preferable less than 1% by weight.

The frozen aerated products of the invention may form part of any composite food product such as for example coated ice cream or an ice cream filled wafer. Further the aerated frozen product may comprise other conventional food product ingredients such as those selected from natural or artificial colourants, flavour extracts, essences or concentrates, whole or comminuted fruit or nut pieces and couvertures as appropriate.

The frozen aerated products of the present invention may be produced by conventional methods used for the product concerned. For example, low fat ice creams may be produced using conventional ice cream production methods including those having homogenisation and/or pasteurisation steps. In such methods, the inclusion of air typically occurs at the same time as the product is frozen. Although the fat platelets that are present may increase the viscosity of the product before aeration, aeration of the product can still be achieved using, for example, APV Technohoy MF75 or alternative mixers such as 5-L Hobart Mixers.

BRIEF DESCRIPTION OF THE DRAWINGS

FIG. 1 is a Scanning electron micrograph (SEM) of a frozen aerated product produced in accordance with the present invention. The frozen aerated product used for this SEM was made from a formulation comprising 4% by weight coconut oil (CNO) with 0.3% Hymono-7804 (H7804) the specification of which is described later. The image is of at a magnification of 4000.

Figure 1:
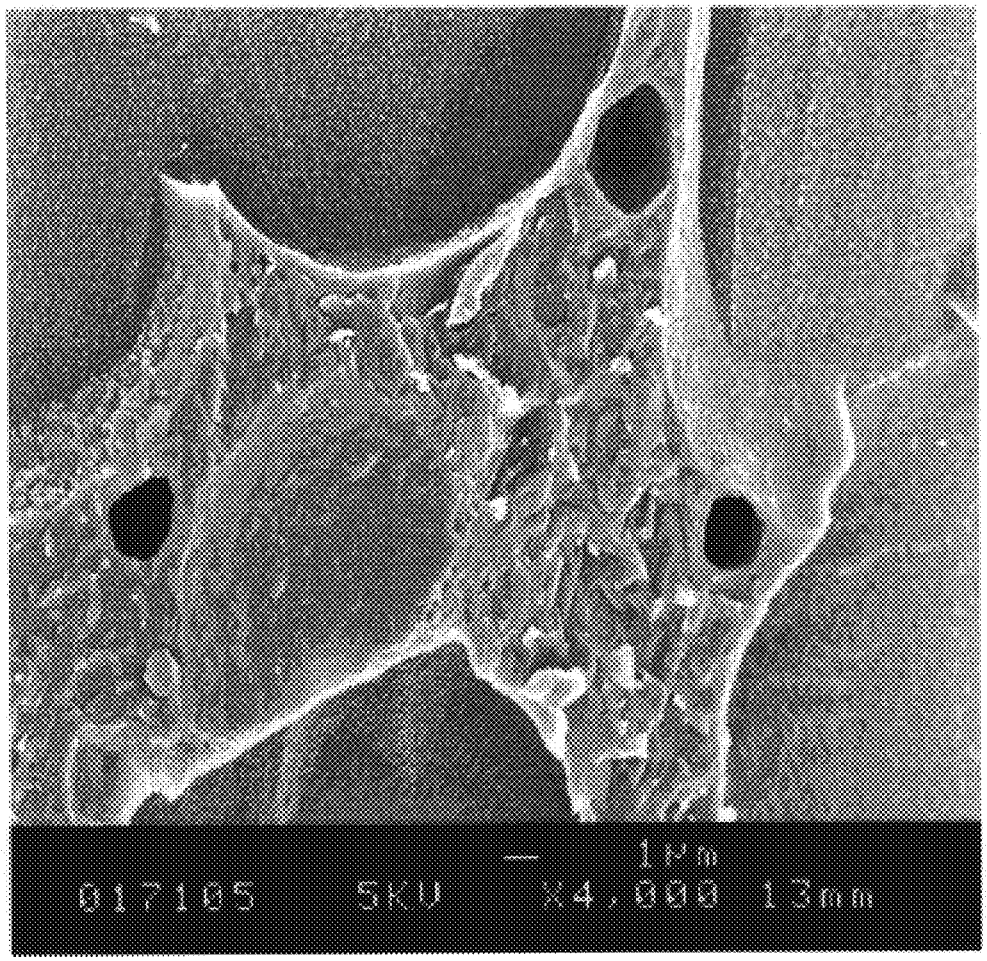
FIG. 1 is a scanning electron micrograph (SEM) of a frozen aerated product made from an ice cream formulation comprising 45 by weight of coconut oil with 0.3% Hymono-7804

As can be seen from the SEM, platelets are shown to co-exist with globules and agglomerated fat which, like the globules are distinguished by the spherical or elliptical form. In this aerated frozen product, there is a smooth air interface and the surrounding medium is homogenous.

Fat platelets have a significantly greater surface area than a sphere of the same volume. Although homogenisation technologies may have the similar effect of increasing the effective surface area of a fixed amount of fat by forming a far greater number of spheres from the original fat content, the change from sphere to platelet which occurs during ageing of the mix that is to be used to form the aerated frozen product of this invention involves a significantly greater increase in that surface area.

The increase in surface area of the fat results in an increase in the viscosity of the mix which can compensate for the reduced fat content and produces desired meltdown properties.

The presence of platelet crystal form as opposed to spheres would be expected to result in the fat having a coarser dispersion in the ice cream that could impact on the mouthfeel and concomitantly the quality of the aerated frozen product. However, frozen aerated products in accordance with this invention have been shown to have an increased perception of fat characterised by an increase in creamy texture, thickness and mouthcoating. An initial icy or crumbly texture has not been observed when consumed after freezing.

Mouthfeel and mouthcoating is linked to flow behaviour of the product as the air cell structure is broken down in the mouth. That part of the frozen product from which air is removed can be related to the rheology of the mix of the product before it is aerated. Such a mix in which platelets are present exhibits marked rheology changes as temperature increases, and this evidenced by values of the storage and loss modulus for the product with temperature, which are respectively indications of the solidity and liquidity of the product. As with spherical fat globules, mixes with fat platelets show a marked increase in the liquidity with temperature (akin to melting). This behaviour must dampen any effect of the crystal form on the mouthfeel of the product.

Further it is a characteristic of a mix comprising platelets that the "melting" is at least partially reversible. On subjecting mixes that contain platelets to a heating—cooling regime under conditions of near constant strain, the increase in liquidity is evidenced as temperature increases but on cooling the mix regains a higher storage modulus than loss modulus. Although, the storage modulus may not regain its original value, it may indicate the fat reforming of a platelet structure. Such properties are only otherwise seen in products having high levels of reversibly gelling stabiliser. It is not seen in systems having low stabiliser levels without fat platelets.

Examples of the products of the invention and comparative examples will now be described by way of illustration only, and not to limit the invention. The Examples shall be described with reference to the accompanying figures.

EXAMPLES

The emulsifiers referred to herein—Hymono7804™ (H7804), and Dimodan-OT™—are recognised industrially available emulsifiers commonly used in the production of frozen aerated products. These emulsifiers have the following specifications:

Hymono7804™ (H7804): available from Quest International; monoglyceride content min. 90%, iodine value 80

Dimodan-OT™: available from Danisco Cultor; monoglyceride content min. 90%; Iodine value 55–65

MGP is Admul MGP 4223 available from Quest International.

The following abbreviations are used to represent the fats present:

HCNO: hardened coconut oil (as obtained HARDCO™ from Loders Croklaan);

HSBO: hardened soy bean oil (obtained from Van den Burgh, Brazil)

PKO: palm kernel oil (PARHI100™ available from Loders Croklaan)

SMP: Skimmed Milk Powder

Formulations 1 to 4 a) Preparation of the Formulations

Table I illustrates the ingredients present in formulations 1 to 4 used for the evaluation of the fat platelets and the properties they impart to the aerated frozen products drive from them. The amount of the ingredients is shown in Table I in percentage by weight.

TABLE I

| Ingredients | SMP | Whey | Sucrose | HCNO | Guar Gum | Water | MGP | H7804 |
|---|---|---|---|---|---|---|---|---|
| 1 | 5 | 3 | 18 | 5 | 0.2 | 68.5 | 0.3 | 0.0 |
| 2 | 5 | 3 | 18 | 5 | 0.2 | 68.5 | 0.0 | 0.3 |
| 3 | 5 | 3 | 18 | 5 | 0.2 | 68.5 | 0.1 | 0.2 |
| 4 | 5 | 3 | 18 | 5 | 0.2 | 68.5 | 0.2 | 0.1 | i) Preparation of the Pre-mix

The pre-mix is the unhomogenised, unpasteurised mixture of ingredients. 50 kg of pre-mix from each of the formulations of Table I was made up by adding the milk powders, sugars and stabiliser to water at 55° C. In these formulations, emulsifiers were dissolved in molten fat before the mixture was blended with the aqueous ingredients.

ii) Preparation of the Mix

The pre-mix was then heated to 82° C. with a plate heat exchanger, followed by homogenisation with a single stage valve homogeniser (APV Crepaco Homogeniser F-8831 3DDL) at 140 bar pressure. The pre-mix was then pasteurised at this temperature for 25 seconds. The mix was cooled to 5° C. with a plate heat exchanger, and then collected in 50 kg stainless steel churns. Small samples of each mix formulation were separated to be used for rheological analysis but all portions (for these formulations) were stored for 4 hours (aging time) at 2° C.

iii) Preparation of Aerated Mixes

After the specified aging time, the mixes were frozen. An APV M75 freezer was used to process all of the mixes. All aerated products were produced at 100% overrun with a mix throughput of 40 L hr$^{-1}$. The extrusion temperature was between −4 and −6° C. Products were collected in 500 Ml waxed paper cartons and hardened in a blast freezer at −35° C. for 2 hours before storage at −25° C.

iv) Processing of Aerated Frozen Products for TEM Analysis

Approximately 25 cm$^3$ samples of ice cream were melted in an incubator at approximately +50° C. and held at +50° C. for 10 minutes. The samples were then cooled to 20° C. and stored +4° C. for 24 hours. After this the samples were phase separated. A drop from the central area of the thick upper layer was sampled and slam cooled using a Reichert Jung KF80 with a copper block temperature of −184° C.

The samples were freeze fractured using a Cressington CFE 50 at −184° C., etched at −98° C. for 9 minutes and replicated, 45° angle Pt/C unidirectional and 90° angle rotary C backing. Coating thickness varied between 1.8 to 2.8 nm Pt/C and 7.3 to 15 nm C. Replicas were floated off using distilled water cleaned chloroform/methanol (ratio 2:1) for several hours, collected onto 200 to 1000 mesh Au TEM grids and dried over night at room temperature. If after initial examination additional replica cleaning was required saturated aqueous chromic acid was used overnight, followed by several washes of distilled water and air drying.

Replicas examined using a Jeol 1220 TEM and images acquired using AnalySiS software combined with a Kodak mega plus camera. Images analysed using KS400 Carl Zeiss image analysis system.

Figure 2:
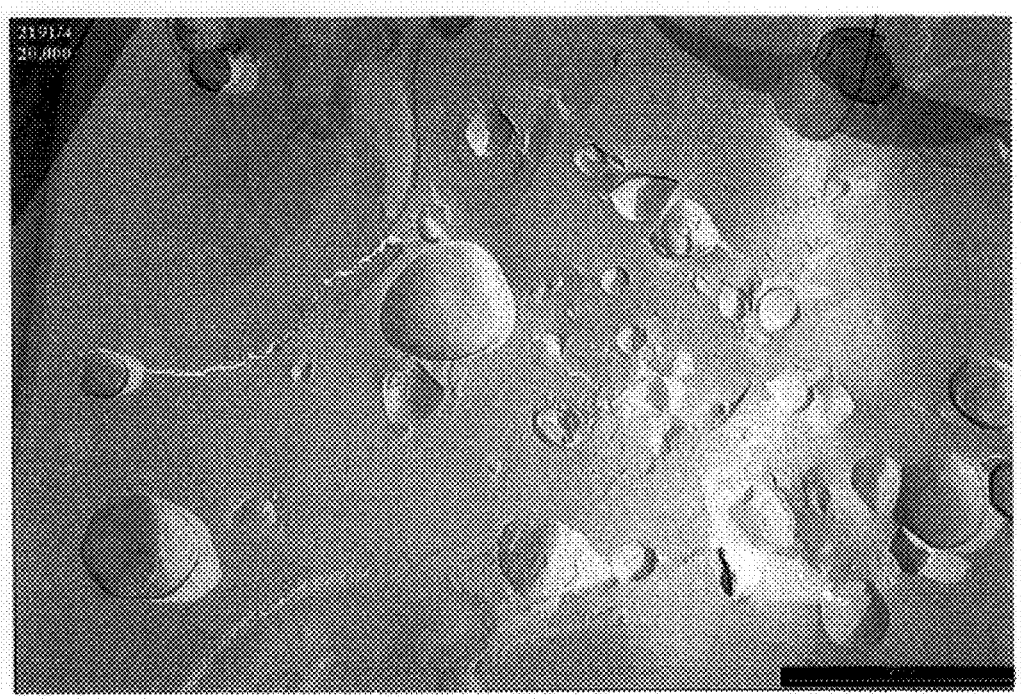
FIG. 2 is a Transmission Electron Micrograph (TEM) of ice cream formulation 1.

FIG. 2 is a Transmission Electron Micrograph in accordance with formulation 1. The image was at a magnification of 20,000.

Figure 3:
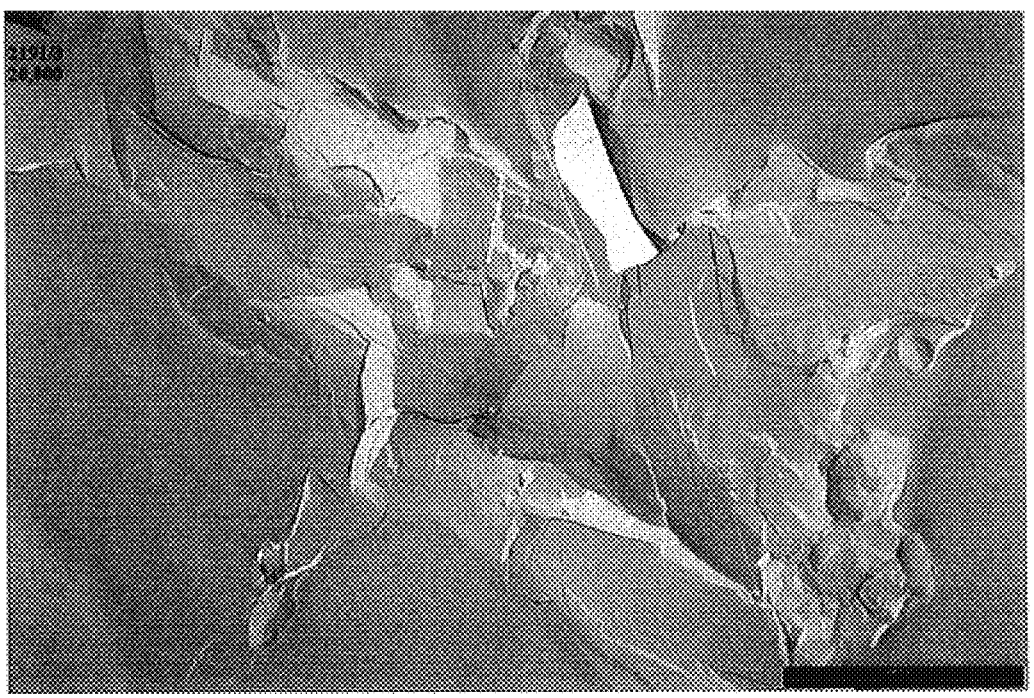
FIG. 3 is a TEM of ice cream formulation 2.

FIG. 3 is a Transmission Electron Micrograph in accordance with the formulation 2. The image was at a magnification of 20,000.

FIG. 2 represents a TEM image of a standard ice cream that does not include platelets. The skilled man using his factual knowledge would clearly locate the fat globules present by their spherical fracture. By contract in FIG. 3, these globules are shown to co-exist with fat crystals showing marked lamellar structure.

v) Analysis of TEM Images and Results

The freeze fracture TEM images were analysed for formulations 1 to 4 to obtain the platelet:sphere ratio as outlined below.

Figure 4A:
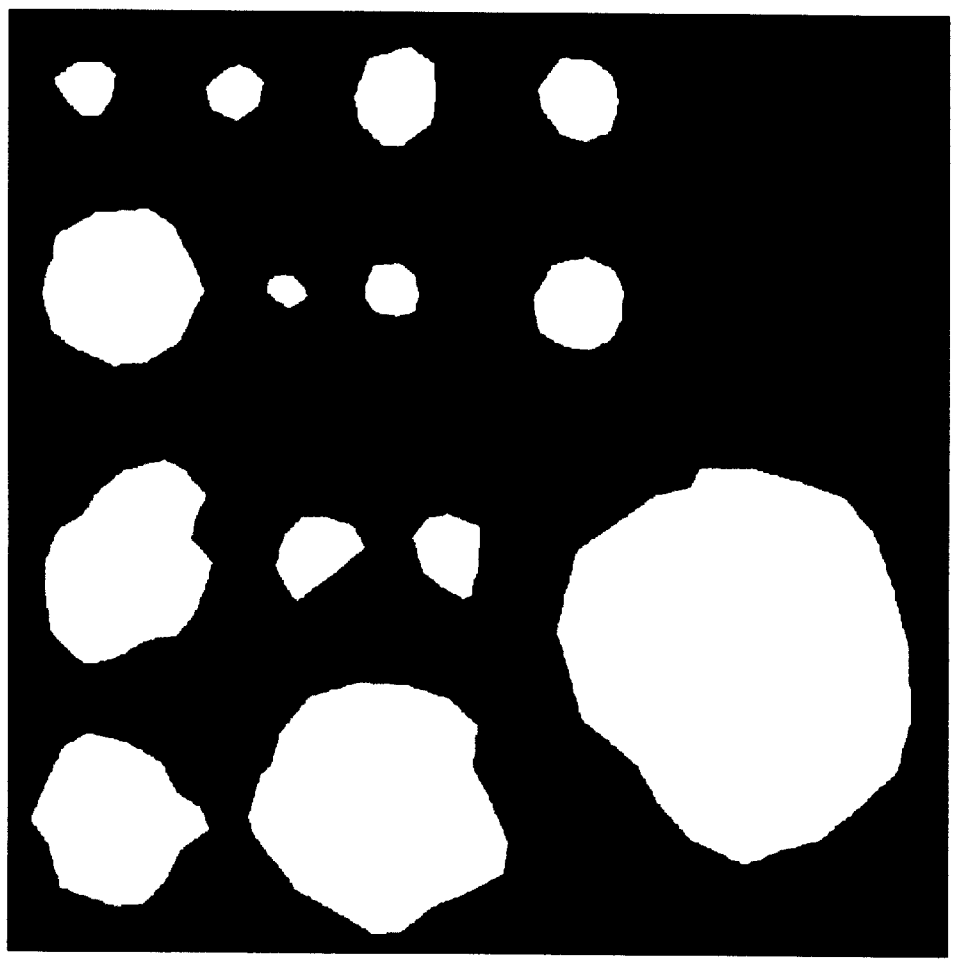
FIG. 4a portrays the digitized training shapes denoting droplets.

The definition of platelet shapes and droplets were first arrived at using a 'training set' of images. By way of illustration, the training sets used to describe 'platelet' shapes and 'spherical' shapes are shown in the appended drawings wherein:

FIG. 4a shows the digitised training shapes denoting droplets.

Figure 4B:
FIG. 4b portrays the digitized training shapes denoting platelets.

FIG. 4b shows digitised training shapes denoting platelets.

The user draws around all the droplet and platelet particles present in the range of training set images by using a Carl Zeiss Vision GmbH KS 400 (release 3.0) image analysis software to capture these hand drawn outlines.

A description of these training 'shapes' was then undertaken via a Fourier analysis of the shape of the outline (25 harmonic terms were used to describe each particle). The analysis is based on the radius vector approach as described by A G Flook: Acta Stereologica 1984 Vol 3 No 2 pp 159–164 'A Comparison of Quantitative Methods of Shape Characterisation' and references therein. Such an analysis function is commercially available from A G Flook and can be purchased and installed as a component of the KS 400 image analysis package.

Classification of particle shape (platelet or sphere) was then undertaken using principle component analysis on the Fourier shape description data. The particle classes (droplets and platelets) were well described by the Fourier method and hence required only the first principle component to complete the classification. The principle component approach to classification problems is well known, see for example J. E. Jackson 'A users guide to principle components' Wiley and Sons Inc. (1991). The classification stage was carried out by developing a principle component algorithm using software from Mathworks Inc. MATLAB version. 6.0.0.88 (release 12).

This analysis and classification scheme was then be employed on the formulation TEM images according to the following methodology:

i) The user draws around all fat phase particles that are wholly contained within the TEM image.

ii) The area data for all fat particles are captured using the KS400 software package.

iii) Fourier analysis of the outlines of these shapes is performed.

iv) Classification of the Fourier data is undertaken to see which class of 'shape' the particle belongs to (either platelets or spheres)

v) The ratio of spheres to platelets is then calculated based on the total area of each class of particle present.

Results were obtained for each sample of formulation 1 to 4 so prepared. The averaged results are shown in Table II:

TABLE II

| Formulation | Platelet: Sphere ratio |
|---|---|
| 1 | 0.01 |
| 2 | 0.84 |
| 3 | 0.80 |
| 4 | 0.34 |

As can be seen from Table II, as the concentration of unsaturated monoglyceride emulsifier in the product increases, the platelet to sphere ratio also increases. The formulation without unsaturated monoglyceride shows no platelets for this fat type.

b) Experimental Procedure for Meltdown Tests

Tests were performed on a stainless steel wire mesh grid having a size of 25×25 cm, with 5 mm holes, 1 mm thick wire. Underneath the grid was disposed a collecting vessel (of large enough volume to collect the entire sample tested of the product volume) and balances for weighing the material collected in the vessel. The balances are connected to a data logging system to record the mass collected The grids were placed in a meltdown cabinet set at a constant temperature environment of either 20° C. or 37° C. and which was capable of holding up to 12 of these grids simultaneously. For tests at 37° C., trays of water were placed within the cabinet to increase humidity and prevent any samples placed therein from drying.

For each formulation listed in Table I, melting tests were performed on three samples at each of 20° C. and 37° C. Before placement in the cabinet the ice cream samples were equilibrated in a freezer at −25° C., and then weighed on a zeroed balance. They were then placed on the mesh grid and were arranged randomly over the available positions in the meltdown cabinet. Once all samples were in place, the data logging system measured the amount of collected material every minute over a 240 minute time period.

From the mass of the sample collected over this period, the percentage mass loss of the samples is calculated using the following formula.

$$\% \, MassLoss = \frac{M_t - M_0}{F}$$

wherein;

$M_t$=mass recorded (gram) at time t minute $M_0$=mass recorded (gram) at start of analysis, t=0 minute F=Initial mass of product (gram)

The % mass loss (% ML) for the three samples of each formulation was averaged. Table III indicates the (averaged) % mass loss for formulations 1 to 4 after 120 minutes at 20° C. and 37° C.

Additionally, the initiation time ($t^{4\%}$) for each sample of formulation was calculated. This is defined by the time that elapses before a percentage mass loss of 4% is achieved. The averaged values for each formulation at both temperatures is also included in Table III.

TABLE III

| Formulation | % ML at 20° C. after 120 min | $t^{4\%}$ at 20° C. (min) | % ML at 37° C. after 120 min | $t^{4\%}$ at 37° C. (min) |
|---|---|---|---|---|
| 1 | 36.9 | 48 | 57.7 | 41 |
| 2 | 2.0 | 160 | 4.9 | 116 |
| 3 | 6.0 | 101 | 6.0 | 104 |
| 4 | 15.5 | 63 | 20.4 | 57 |

The initiation times are an indication of whether the aerated product is likely to maintain stability to melting, in particular for the period of consumption of the product.

As shown in Table III, Formulation 1 is the least temperature tolerant of these low fat aerated frozen products. The greater the platelet:sphere ratio, the higher the temperature resistance.

Formulations 5 and 6

Two formulations were evaluated at lower emulsifier concentrations than those used for formulations 1 to 4. These formulations are described in Table IV, the values therein again being expressed in % by weight:

TABLE IV

| Form. | SMP | Whey | Sucrose | HCNO | Guar Gum | Water | MGP | H7804 |
|---|---|---|---|---|---|---|---|---|
| 5 | 5 | 3 | 18 | 5 | 0.2 | 68.5 | 0.275 | 0.025 |
| 6 | 5 | 3 | 18 | 5 | 0.2 | 68.5 | 0.25 | 0.05 |

In accordance with the procedures outlined above samples of these formulations were prepared for TEM imaging.

Figure 5:
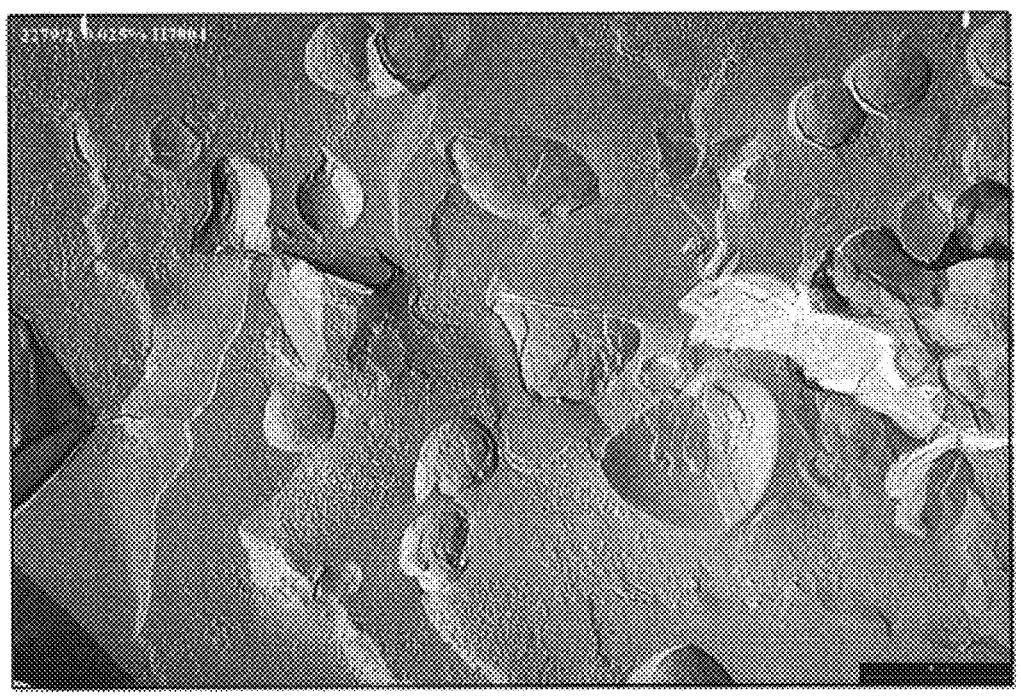
FIG. 5 is a TEM of ice cream mix formulation 5.

FIG. 5 is a Transmission Electron Micrograph of an ice cream mix produced in accordance with formulation 5. The image is at a magnification of 20,000.

Figure 6:
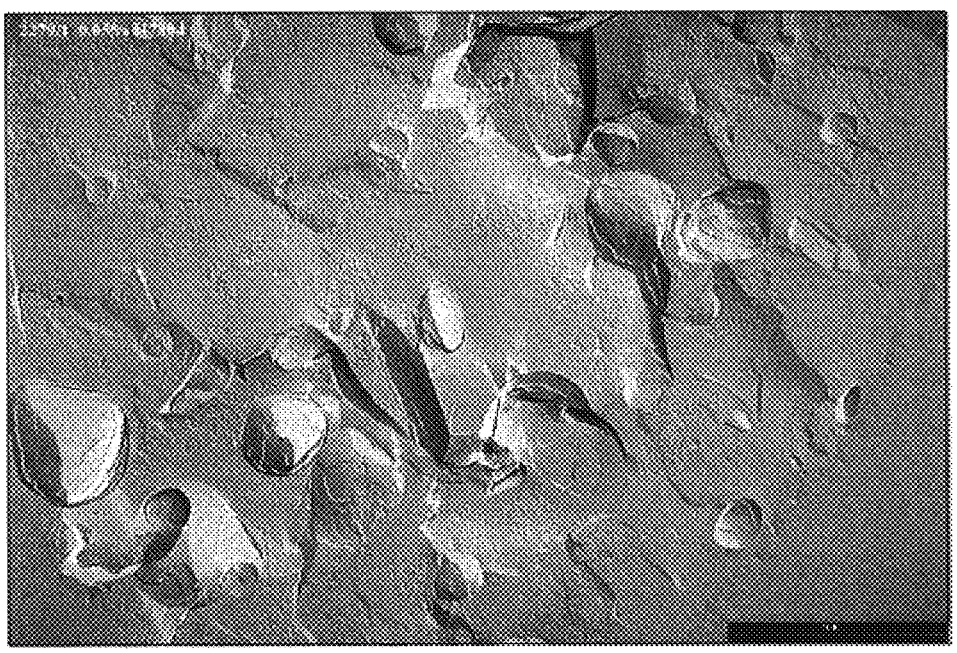
FIG. 6 is a TEM of ice cream mix formulation 6.

FIG. 6 is a Transmission Electron Micrograph of an ice cream mix produced in accordance with formulation 6. The image is at a magnification of 20,000.

TABLE V

| Formulation | Platelet: Sphere ratio |
|---|---|
| 5 | 0.06 |
| 6 | 0.15 |

Both FIGS. 5 and 6 show that fat structures having lamellar fracture are present in the ice cream mix of these formulations. With this type of fat, very low concentrations of unsaturated monoglyceride emulsifier are required for the production of platelets.

The TEM images were analyses to obtain the platelet-:sphere ratio as described above. The results are illustrated in Table VI.

TABLE VI

| Formulation | % ML at 20° C. after 120 min | $t^{4\%}$ at 20° C. (min) | % ML at 37° C. after 120 min | $t^{4\%}$ at 37° C. (min) |
|---|---|---|---|---|
| 5 | 12.4 | 83 | 33.3 | 44 |
| 6 | 12.0 | 85 | 36.4 | 45 |

When the meltdown properties of formulations 5 and 6 are compared to those of formulation 1 it is clear that the former show enhanced meltdown resistance at both the temperatures evaluated. Very small concentrations are required to stabilise the low fat content aerated frozen product at ambient temperature and also to promote gradual meltdown at the elevated temperature.

Formulations 7 to 10

Further formulations were prepared to evaluate the influence of the type of fat and the type of emulsifier on platelet formation and the meltdown properties of the aerated frozen product.

The mixes and pre-mixes for these formulations were prepared as described above. Table VII below illustrates the ingredients present in the formulations. The figures again represent % by weight of the ingredients.

TABLE VII

| Ingredients | Formulations | | | |
|---|---|---|---|---|
| | 7 | 8 | 9 | 10 |
| SMP | 5 | 5 | 5 | 5 |
| Whey | 3 | 3 | 3 | 3 |
| Sucrose | 18 | 18 | 18 | 18 |
| HCNO | — | — | — | 5 |
| Butter Oil | 5 | — | — | — |
| HSBO | — | — | 5 | — |
| PKO | — | 5 | — | — |
| MGP | 0.1 | 0.1 | 0.1 | — |
| H7804 | 0.2 | 0.2 | 0.2 | — |
| Dimodan - O | — | — | — | 0.3 |
| Guar Gum | 0.2 | 0.2 | 0.2 | 0.2 |
| Water | 68.5 | 68.5 | 68.5 | 68.5 |

Figure 7:
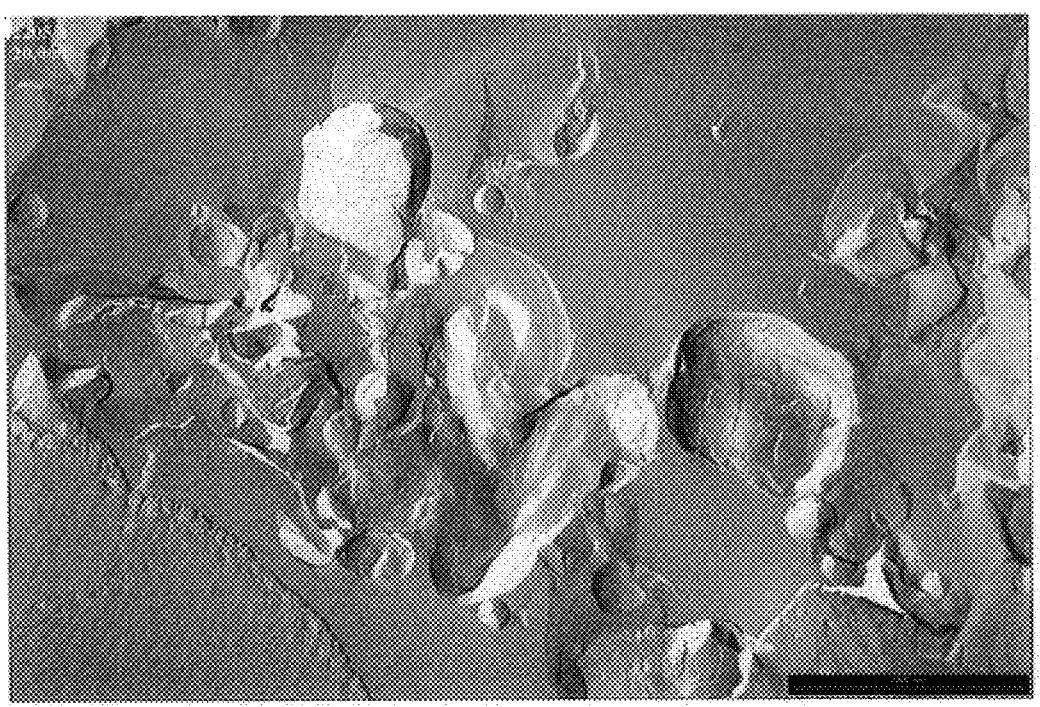
FIG. 7 is a TEM of ice cream mix formulation 7.

Further, in accordance with the procedures above samples of formulation 7 were prepared for TEM imaging and wherein:

FIG. 7 is a Transmission Electron Micrograph of an ice cream mix produced in accordance with formulation 7. The image is at a magnification of 20,000.

As shown in FIG. 5, formulation does not include platelets, only spherical oil droplets. The absence of platelets in this system indicates that their formation is not dependent on emulsifier type only. Butter oil at ageing temperatures has a relatively low solid:liquid ratio in the bulk fat phase within the mix when compared with the HCNO, and this, without being bound by theory may account for its not forming platelets with this emulsifier type.

In accordance with the meltdown procedure described above a plurality of samples of aerated products derived from these formulations were investigated to determine their averaged mass loss and initiation time data at 20° C. and 37° C. The results are included in Table VIII.

TABLE VIII

| Formulation | % ML at 20° C. after 120 min | $t^{4\%}$ at 20° C. (min) | % ML at 37° C. after 120 min | $t^{4\%}$ at 37° C. (min) |
|---|---|---|---|---|
| 7 | 80.3 | 39 | 96.0 | 28 |
| 8 | 7.1 | 94 | 7.0 | 91 |
| 9 | 4.2 | 119 | 31.3 | 46 |
| 10 | 9.6 | 80 | 22.2 | 36 |

Formulation 7 shows the lowest temperature tolerance of all formulations tested, irrespective of the presence of unsaturated monoglyceride emulsifier. Its low initiation time indicates that it is not suitable for use as a frozen aerated product within for example, a dessert.

Formulations 8 and 9 both show stabilisation effects and gradual meltdown at the elevated temperature. The fat types used here are acting in a similar way to the hardened coconut oil.

In formulation 10, which used a different small molecular emulsifier having a different level of unsaturation as evidenced by their iodine values disclosed above, a similar level enhanced temperature resistance in comparison to non-platelet systems is also exhibited.

c) Rheological Analysis of Formulations

To determine rheological characteristics of the platelet and non-platelet containing systems, rheological tests on the formulations 2 and 7 were performed on a AR1000-N Rheometer (TA Instruments) using a peltier plate for temperature control. A steel 4 cm-diameter plate geometry was used with a 1 mm gap. Emery paper was attached to each plate. Each formulation was loaded on the peltier plate so as to minimise damage.

The formulations were subjected to small deformation oscillatory tests using a temperature sweep procedure. Instrument control software (Rheology Advantage Investment Control Software, Version V.I.O.O, TA Instruments) was used. Whilst minimising fluctuation of strain—it would be recognised that perfect control of strain is impossible as the temperature increases—from 0.01 and using an oscillation frequency of 1 Hz, the samples were heated in a first step from 10° C. to 40° C. at rate of 1° C. per minute to allow equilibration of the temperature. (It is herein noted that formulations 2 and 7 contain fats that each show "melting" at temperatures less than 40° C. Fats that would produce platelets and "melt" at higher temperatures are envisaged in this invention and a larger temperature sweep would be necessitated in such a case.) Whilst maintaining the strain and oscillation frequency, the samples were allowed to cool in a second step from 40° C. to 10° C. at a rate of 1° C. per minute. Using Rheology Advantage Data Analysis, Version V.I.O. 71, available from T.A. Instruments, values of Loss Modulus (G") and Storage Modulus (G') were obtained for the whole of temperature regime the heating and cooling steps. Loss Modulus (G') is a measure of the viscous response of the sample, and Storage Modulus (G") is a measure of the elastic response of the sample to strain applied. The loss modulus and the storage module are defined by the following equation:

$$G' = G^* \cos \delta$$

$$G'' = G^* \sin \delta$$

wherein δ is the measure of phase angle between applied stress and strain response, and G* is the instantanious ratio of stress amplitude to strain amplitude.

Figure 8:
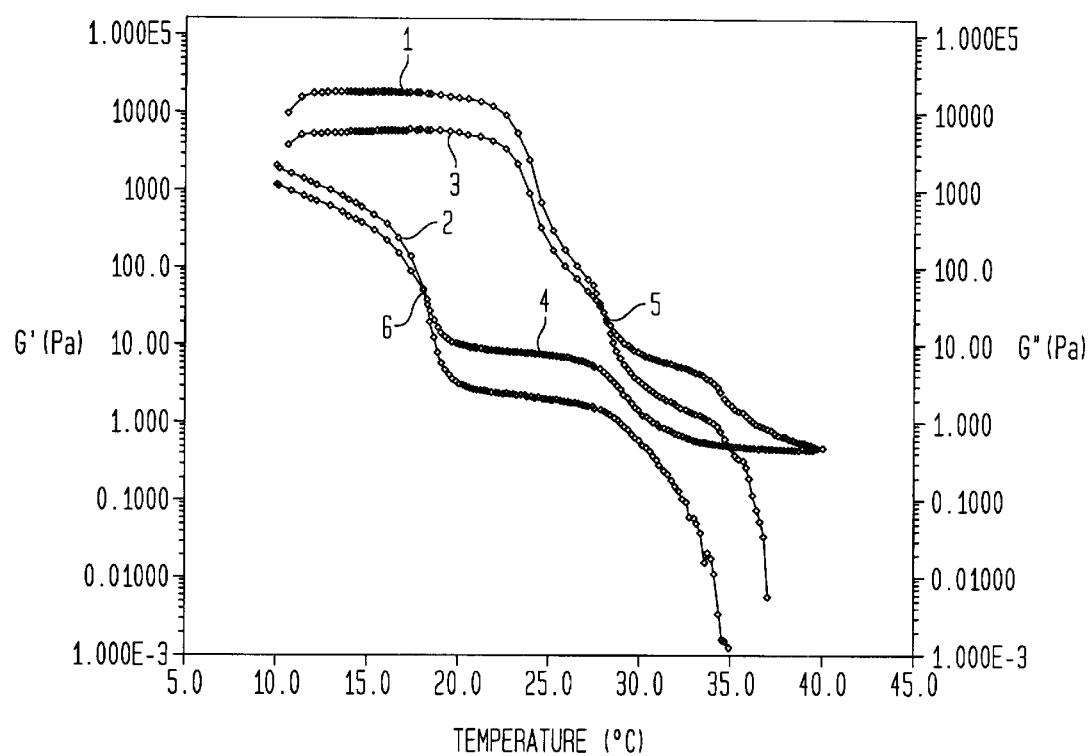
FIG. 8 is a plot of loss modulus G" and storage modulus G' with temperature for a heating-cooling regime for ice cream mix comprising platelets and spheres of formulation 2.

FIG. 8 is a plot of Loss modulus (G") and Storage modulus (G') with temperature for a heating-cooling regime for a mix comprising platelets and spheres in co-existence in accordance with formulation 2.

In FIG. 8 the reference numerals are used to denote the following:

Curve 1: Storage Modulus (G") for the heating regime
Curve 2: Storage Modulus (G") for the cooling regime
Curve 3: Loss Modulus (G') for the heating regime
Curve 4: Loss Modulus (G') for the cooling regime
Points 5, 6: Points of inversion FIG. 9 is a plot of Loss modulus (G") Storage modulus (G') with temperature for a heating-cooling regime for an ice cream mix comprising only spheres in accordance with formulation 7.

Figure 9:
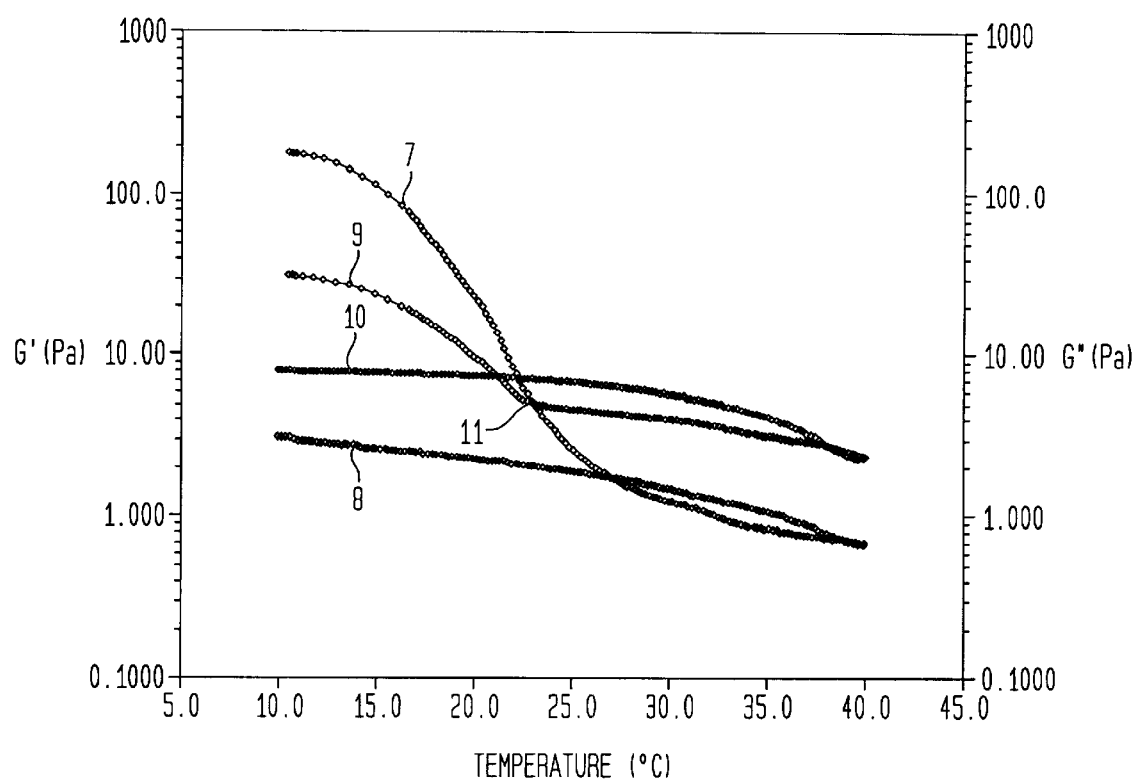
FIG. 9 is a plot of Loss modulus G" and storage modulus G' with temperature for a heating-cooling regime for ice cream mix comprising platelets and spheres of formulation 7.

In FIG. 9 the reference numerals are used to denote the following:

Curve 7: Storage Modulus (G") for the heating regime
Curve 8: Storage Modulus (G") for the cooling regime
Curve 9: Loss Modulus (G') for the heating regime
Curve 10: Loss Modulus (G') for the cooling regime
Point 11: Point of inversion It is shown in FIGS. 8 and 9 (from curves 1 and 7 respectively) that both formulations 2 and 7 have a storage modulus greater than their loss modulus at 10° C. before heating. However, the solidity of the platelet system, as indicated by its storage modulus is greater than the corresponding measure for the non-platelet system. Frozen aerated products comprising butter oil typically include flocculated fat which may account for the similarity in viscosity. This indicates that the platelet system is more effective at increasing viscosity than the flocculated globular fat found in the non-platelet system. (One would expect this property to be directly translated to the viscosity of the continuous phase of the aerated product.)

On heating both formulations 2 and 7 lose their structure due to melting of the fat and the concomitant increase in liquidity results in the loss modulus and storage modulus inverting as shown at points 5 and 11 respectively in FIGS. 8 and 9. On recooling formulation 2, a second inversion (point 6) is also observed whereby the storage modulus (curve 2) reverts to a higher value than the loss modulus (curve 4). This indicates reformation of structure in the mix.

By contrast formulation 7, no second inversion of the loss and storage modulus curves is shown for the cooling regime (curves 8 and 10). A high level of liquidity is maintained which indicates that no fat structure is reformed.

It is noted that temperature inversion similar to that of the platelet system may be observed for products having high levels of reversible gelling stabiliser. However, this is not the case in these formulations whereby the concentration of guar gum stabiliser is low.

Formulations 11 to 14

As described above a number of variables are possible in production processes for frozen aerated products. The effect of ageing of the product mix, the homogenisation pressure used, and of dissolution of the emulsifier in water (as opposed to oil) was herein investigated.

Formulations 11 to 14 have the ingredients shown in Table IX. Samples were prepared for meltdown tests in accordance with the protocols described above except that certain experimental steps (indicated in Table IX) were performed during the production of the aerated frozen product.

With respect to formulation 11 the pre-mix was heated with a plate heat exchanger to 82° C., homogenised with an APV single stage valve homogeniser at 300 bar pressure and pasteurised for 25 seconds at this temperature.

In formulation 12, the emulsifiers were dispersed in the aqueous phase rather than in molten fat before the mixture was blended with the aqueous ingredients to form the pre-mix.

For formulations 13 and 14, after the homogenised mix was cooled to 5° C. with a plate heat exchanger and collected in the churns, the mixes were aged for 1 hour and 24 hours respectively (as opposed to the 4-hour ageing times employed with the above formulations).

Values in the Table IX are again expressed in % by weight.

TABLE IX

| Ingredients and process step | 11 | 12 | 13 | 14 |
| --- | --- | --- | --- | --- |
| SMP | 5 | 5 | 5 | 5 |
| Whey | 3 | 3 | 3 | 3 |
| Sucrose | 18 | 18 | 18 | 18 |
| HCNO | 5 | 5 | 5 | 5 |
| Guar Gum | 0.2 | 0.2 | 0.2 | 0.2 |
| MGP | 0.1 | 0.1 | 0.1 | 0.1 |
| H7804 | 0.2 | 0.2 | 0.2 | 0.2 |
| Water | 68.5 | 68.5 | 68.5 | 68.5 |
| Experiment Step | 300 bar homogenisation pressure | Emulsifier Dissolved in water | 1 hr ageing | 24 hr ageing |

In accordance with the meltdown procedure described above a plurality of samples of aerated products derived from these formulations were investigated to determine their averaged mass loss and initiation time data at 20° C. and 37° C. The results are included in Table X.

TABLE X

| Formulation | % ML at 20° C. after 120 min | $t^{4\%}$ at 20° C. (min) | % ML at 37° C. after 120 min | $t^{4\%}$ at 37° C. (min) |
| --- | --- | --- | --- | --- |
| 11 | 2.0 | 144 | 8.3 | 85 |
| 12 | — | — | 27.6 | 49 |
| 13 | 2.8 | 134 | 9.6 | 76 |
| 14 | 4.7 | 114 | 14.2 | 63 |

Formulation 11 shows a high temperature tolerance at both 20° C. and 37° C. It is known that when a standard ice cream mix is subjected to high pressure homogenisation the fat is distributed in the mix in a larger amount of spherical globules of smaller size. The high temperature tolerance of formulation 11 may be explained by a similar effect in a platelet system, whereby the fat is distributed amongst smaller platelets, with the concomitant influence on the viscosity of the continuous phase and the stabilisation of the air cell structure.

Importantly, formulation 12 showed at 37° C. a slightly lower temperature tolerance than formulation 3, which differed only in the emulsifier system. Modifying this emulsifier system must affect the formulation of platelets, and therefore their function in stabilising the ice cream.

Similarly, formulations 13 and 14 did not show significantly different temperature tolerance at 20° C. than formulation 3 which differed only in the fact that the mix was not aged for the stated periods. For this fat type and small molecular emulsifier, aging may not influence fat crystallisation to the extent typically observed in standard frozen aerated products.

What is claimed is:

1. An aerated frozen product comprising less than 8% fat by weight and characterized in that the aerated frozen product comprises fat platelets, and after it has been melted and cooled, comprises fat platelets and spherical fat globules at a platelet to sphere ratio of greater than 0.05.

2. An aerated frozen product according to claim 1, wherein the aerated frozen product further comprises an emulsifier.

3. An aerated frozen product according to claim 1, wherein the aerated frozen product satisfies the condition that percentage mass loss after 120 minutes is less than 90% at 20° C.

4. An aerated frozen product according to claim 3, wherein the percentage mass loss after 120 minutes is less than 80% at 20° C.

5. An aerated frozen product according to claim 1, wherein the aerated frozen product satisfies the condition that the percentage mass loss after 120 minutes is less than 100% at 37° C.

6. An aerated frozen product according to claim 5, wherein the percentage mass loss after 120 minutes is less than 90% at 37° C.

7. An aerated frozen product according to claim 1 wherein the platelet to sphere ratio is greater than 0.3.

8. An aerated frozen product according to claim 7 wherein the platelet to sphere ratio is greater than 0.6.

9. An aerated frozen product according to claim 1, wherein the aerated frozen product comprises an effective amount of fat selected from the group consisting of hardened coconut oil, hardened soy bean oil, and palm kernel oil.

10. An aerated frozen product according to claim 2, wherein the emulsifier comprises a fatty acid monoglyceride having an iodine value greater than 50.

11. An aerated frozen product comprising:
  i) less than 6% fat by weight wherein the fat is selected from the group consisting of hardened coconut oil, hardened soy bean oil, and palm kernel oil; and
  ii) an emulsifier; and characterized in that;
  the aerated frozen product comprises fat platelets, and after it has been melted and cooled comprises fat platelets and spherical fat globules at a platelet to sphere ratio of greater than 0.05; and
  the aerated frozen product satisfies the condition that the percentage mass loss after 120 minutes is less than 30% at 20° C.

12. An aerated frozen product comprising:
  i) less than 6% fat by weight wherein the fat is selected from the group consisting of hardened coconut oil, hardened soy bean oil, and palm kernel oil; and
  ii) an emulsifier; and characterized in that;
  the aerated frozen product comprises fat platelets, and after it has been melted and cooled, comprises fat platelets and spherical fat globules at a platelet to sphere ratio of greater than 0.05; and
  the aerated frozen product satisfies the condition that the percentage mass loss after 120 minutes is less than 50% at 37° C.

* * * * *